United States Patent
Lockhart

(10) Patent No.: US 7,403,953 B2
(45) Date of Patent: Jul. 22, 2008

(54) METHODS AND APPARATUS FOR A DYNAMIC MESSAGING ENGINE

(75) Inventor: John Lockhart, Scottsdale, AZ (US)

(73) Assignee: Amazingmail.com, Scottsdale, AZ (US)

( * ) Notice: Subject to any disclaimer, the term of this patent is extended or adjusted under 35 U.S.C. 154(b) by 135 days.

(21) Appl. No.: 10/264,299

(22) Filed: Oct. 3, 2002

(65) Prior Publication Data

US 2003/0126217 A1 Jul. 3, 2003

Related U.S. Application Data

(60) Provisional application No. 60/326,776, filed on Oct. 3, 2001.

(51) Int. Cl.
*G06F 17/30* (2006.01)
*G06F 15/16* (2006.01)

(52) U.S. Cl. ............................... 707/102; 707/1; 707/6; 707/10; 709/206

(58) Field of Classification Search .................. 707/10, 707/100, 101, 1–6, 102, 200, 203; 709/206, 709/201

See application file for complete search history.

(56) References Cited

U.S. PATENT DOCUMENTS

| 6,718,367 | B1 * | 4/2004 | Ayyadurai | 709/206 |
| 2002/0116463 | A1 * | 8/2002 | Hart | 709/206 |
| 2003/0018752 | A1 * | 1/2003 | Lowy | 709/219 |

* cited by examiner

*Primary Examiner*—Don Wong
*Assistant Examiner*—Marcin Filipczyk
(74) *Attorney, Agent, or Firm*—Snell & Wilmer L.L.P.

(57) ABSTRACT

A dynamic message engine allows the merging of data using a variety of databases to deliver mail items to selected recipients, wherein the mail items include content which is filtered or otherwise limited by the system. In one embodiment, invitations to seminars (e.g., seminars directed at pharmaceuticals) are prepared and sent to a plurality of physicians selected from a physician database, wherein the content of the invitation includes text selected from a predetermined set of acceptable text items and/or wherein the content is filtered in accordance with predetermined criteria.

11 Claims, 12 Drawing Sheets

METHODS AND APPARATUS FOR A DYNAMIC MESSAGING ENGINE

CROSS-REFERENCE TO RELATED APPLICATIONS

This application claims priority from U.S. Provisional Patent Application Ser. No. 60/326,776, filed Oct. 3, 2001.

TECHNICAL FIELD

The present invention relates generally to corporate/client communications and, more particularly, to an improved method of preparing and sending correspondence (e.g., postcards, invitations, and the like) utilizing a dynamic messaging engine.

BACKGROUND

It is often desirable for organizations to send reminders, invitations, and other such correspondence to a large set of predetermined individuals. For example, in the field of pharmaceuticals, symposia and other such informational seminars are often organized for the purpose of presenting information to physicians regarding various drugs and other medical advancements. Accordingly, it is often necessary for the organization (e.g., the pharmaceutical company) to prepare a large number of invitations to a target list of physicians. This is a difficult task for a number of reasons. For example, it is usually cumbersome to determine which physicians are likely to be interested in which seminars. Furthermore, the invitation is likely to be fairly impersonal.

An additional difficulty posed by the preparation of such invitations is that the individual or group drafting the invitation might inadvertently utilize language that is inappropriate or does not fit within some other criteria. For example, in the field of pharmaceutical sales, it would be undesirable to include language in an invitation that appears to warrant that certain benefits will result from taking the drug. Given the rather litigious nature of the medical field and the rising cost of malpractice insurance, it is relatively easy and undesirable to inadvertently include language in an invitation that arguably exposes that organization to legal liability.

Accordingly, there is a long-felt need for a system for preparing a large number of invitations or other such pieces of correspondence in a manner which is efficient and which helps to prevent or reduce the likelihood that the correspondence will include inappropriate language.

BRIEF SUMMARY OF THE INVENTION

The present invention addresses limitations in the prior art by providing a dynamic message engine that allows the merging of data using a variety of databases to deliver mail items to selected recipients, wherein the mail items include content which is filtered or otherwise limited by the system. In one embodiment, invitations to seminars (e.g., seminars directed at pharmaceuticals) are prepared and sent to a plurality of physicians selected from a physician database, wherein the content of the invitation includes text selected from a predetermined set of acceptable text items and/or wherein the content is filtered in accordance with predetermined criteria.

BRIEF DESCRIPTION OF THE DRAWINGS

The present invention is illustrated by way of example and not limitation in the accompanying figures, in which like references indicate similar elements, and in which.

DETAILED DESCRIPTION OF THE INVENTION

Figure 1:
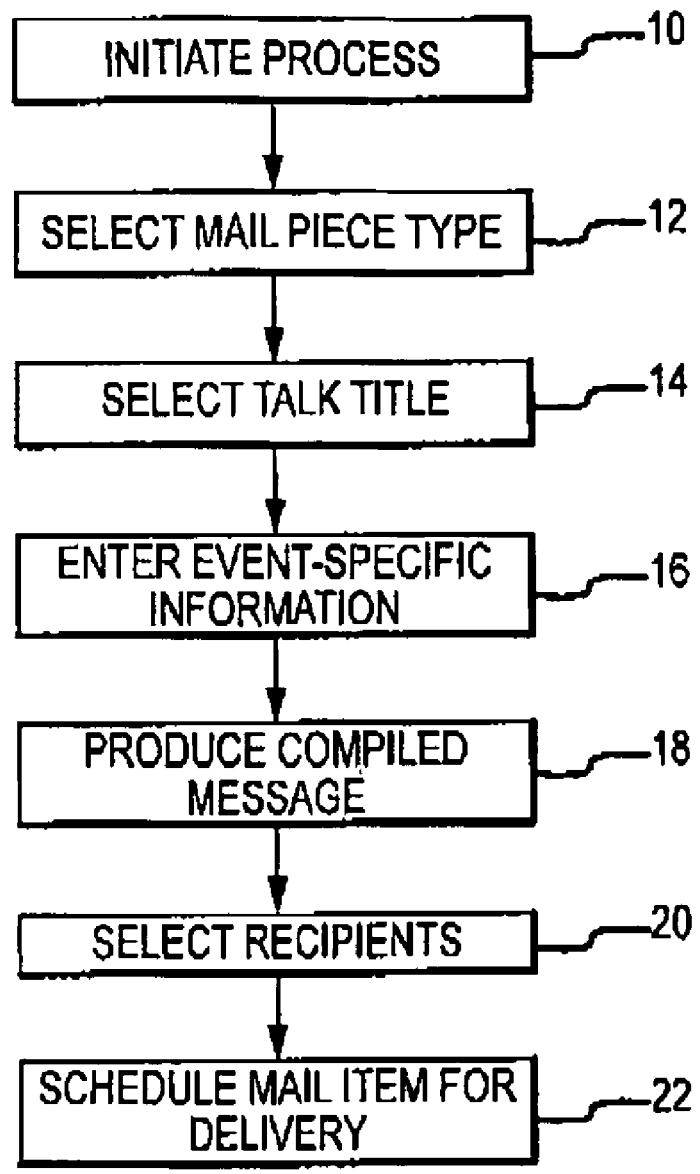
FIG. 1 is a flowchart depicting a process in accordance with the present invention.
Figure 2:
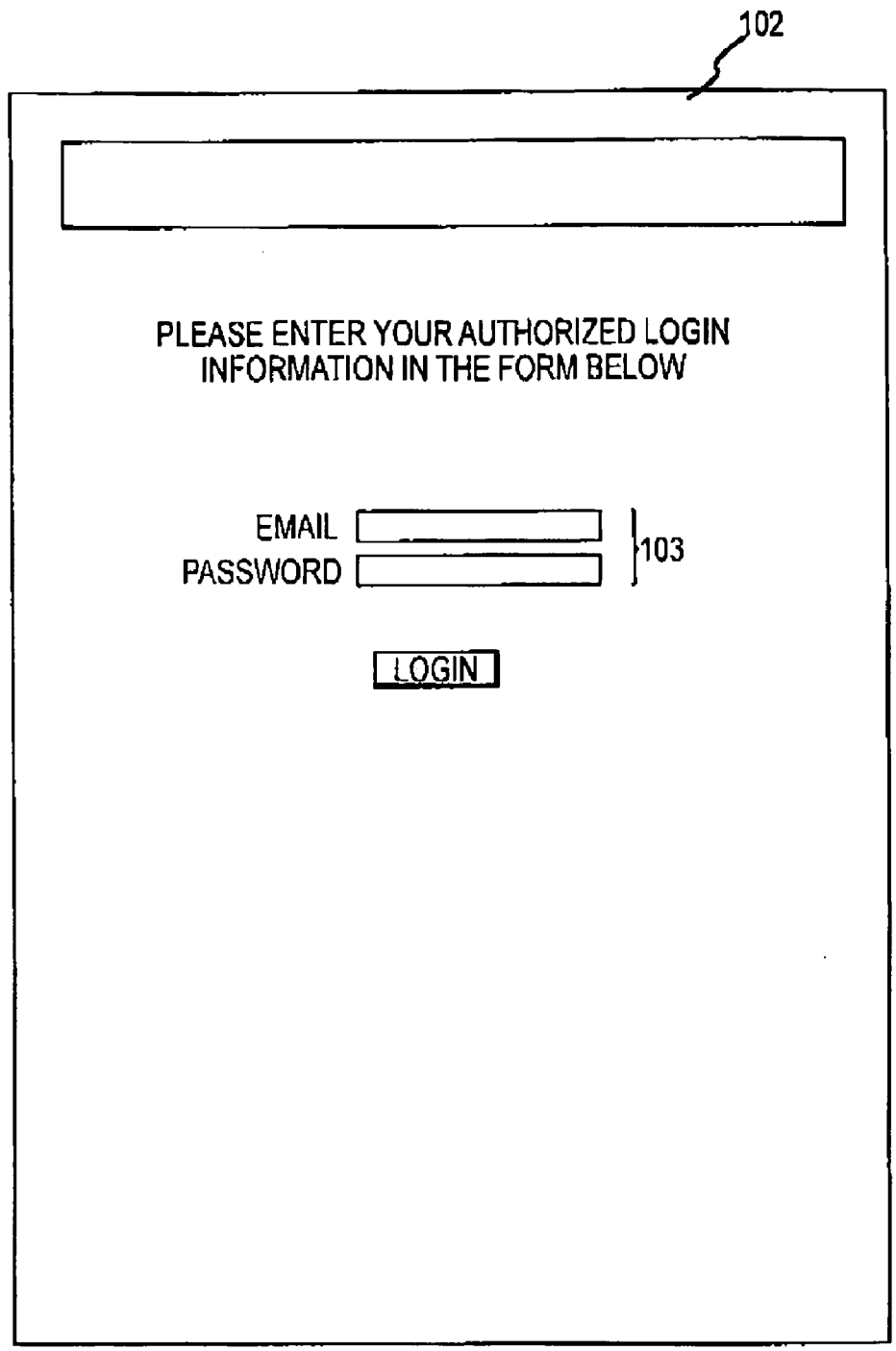
FIG. 2 is an exemplary web page for collecting log-in data.
Figure 3:
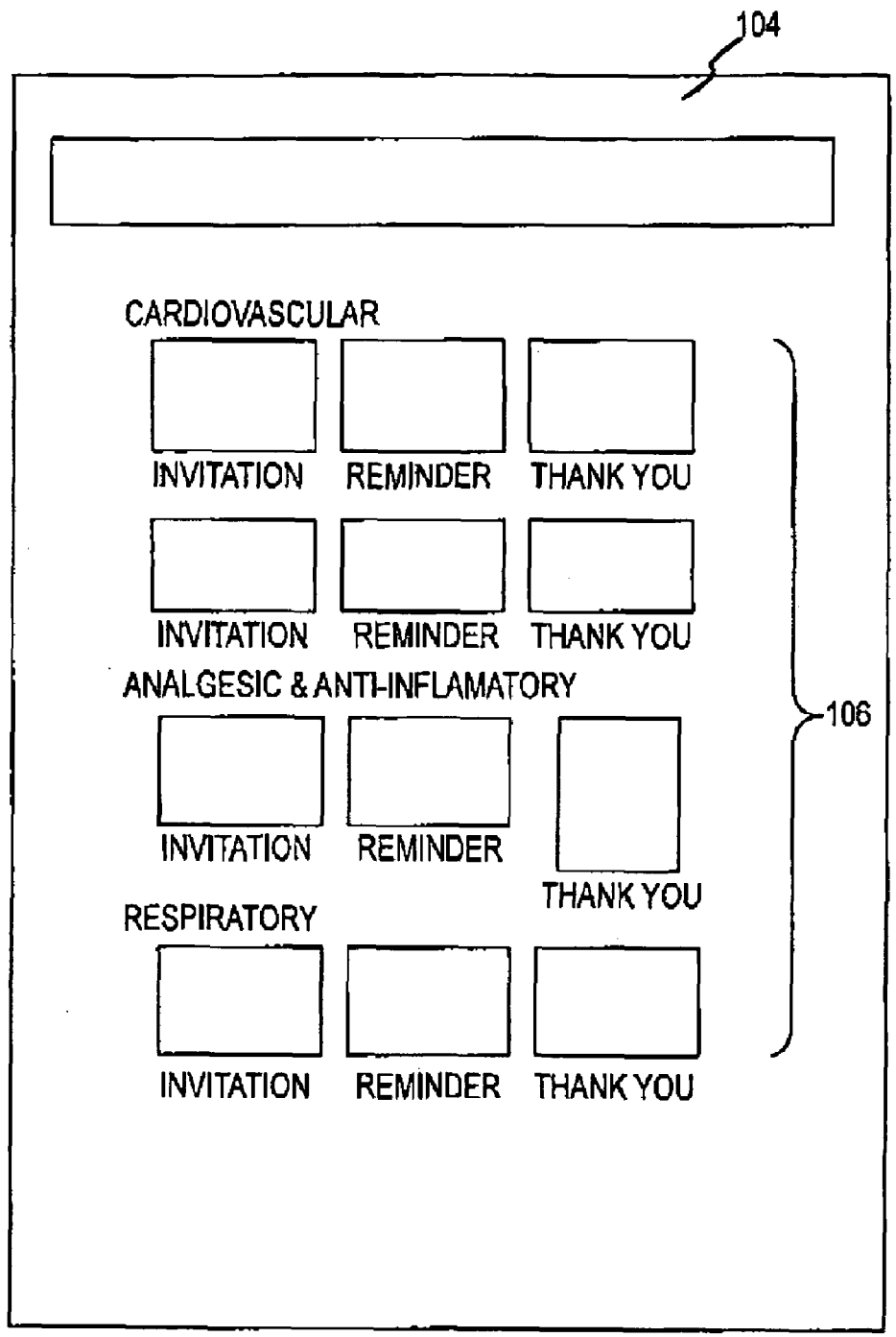
FIG. 3 is an exemplary web page for selecting a type of mail piece.
Figure 4:
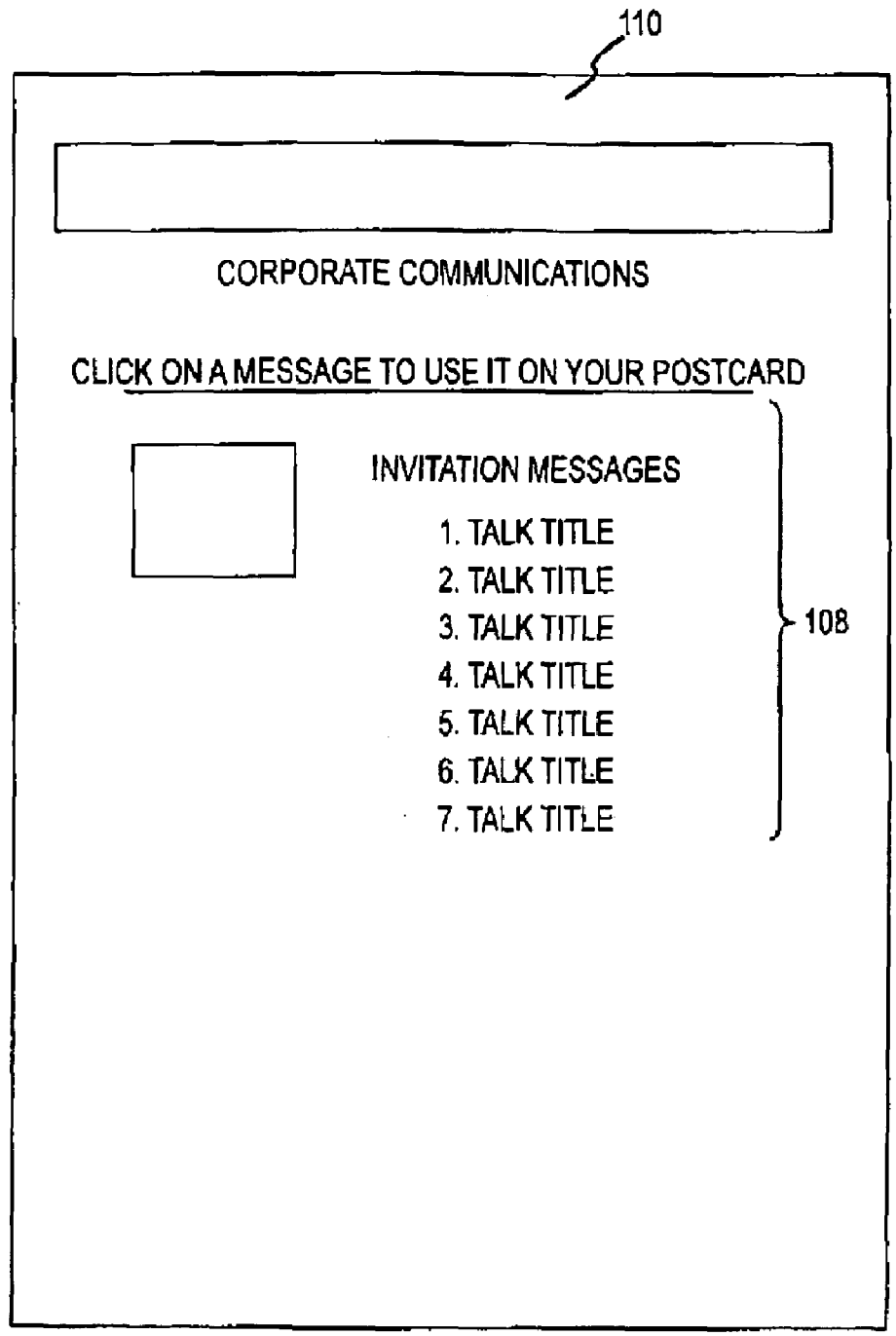
FIG. 4 is an exemplary web page for selecting a talk title.
Figure 5:
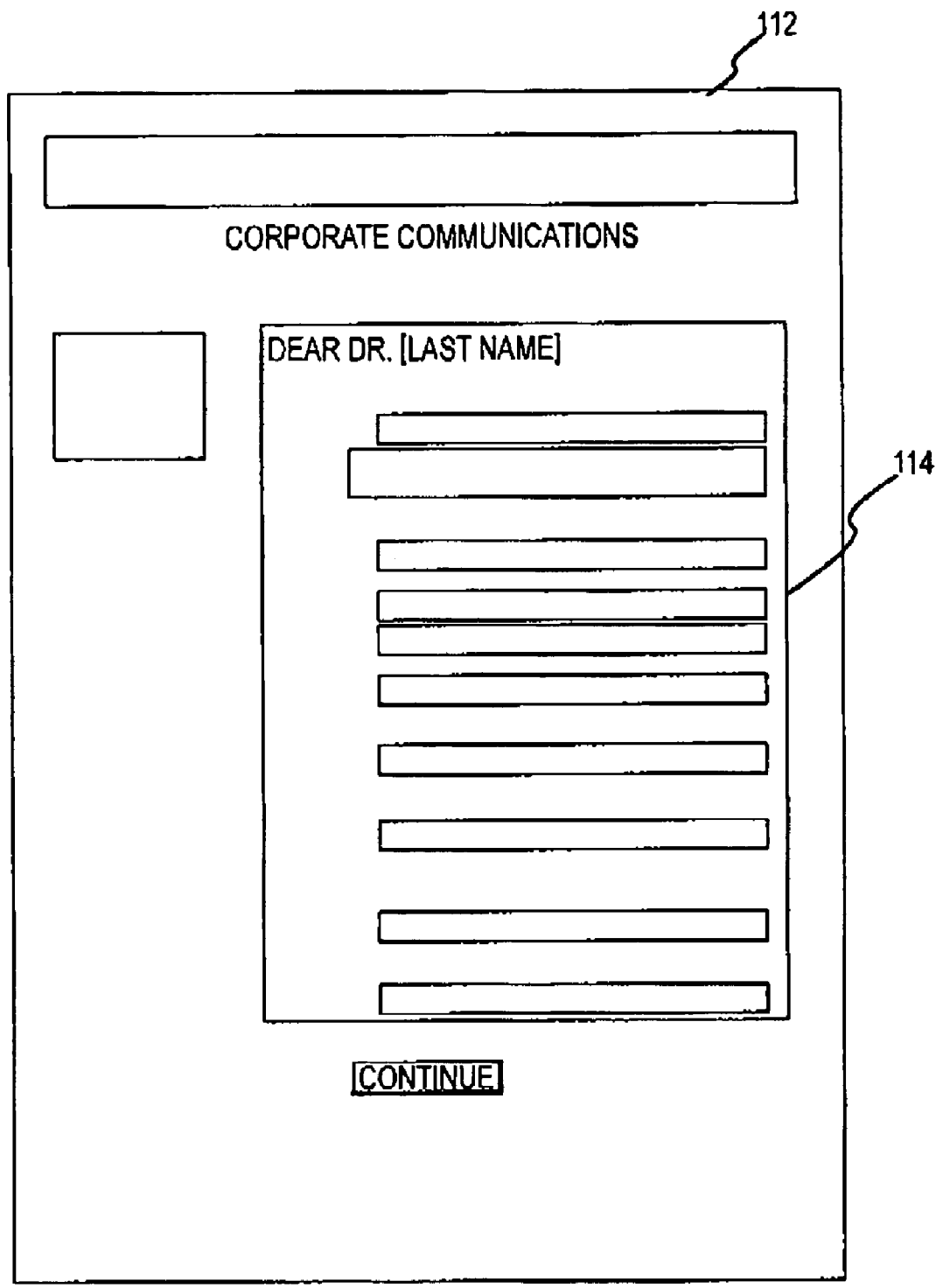
FIG. 5 is an exemplary web page for entering event-specific information.
Figure 6:
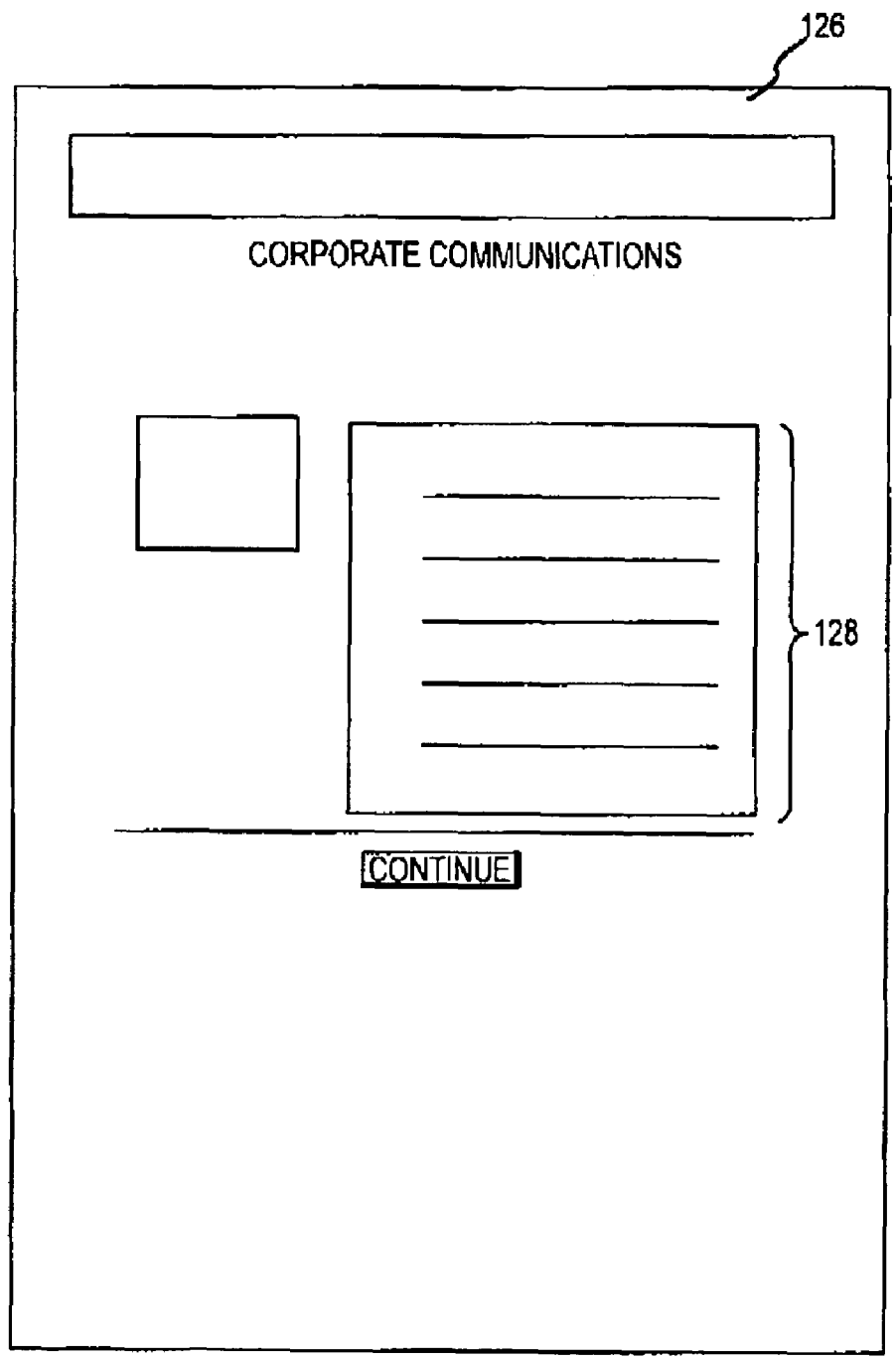
FIG. 6 is an exemplary web page for previewing a compiled message.
Figure 7:
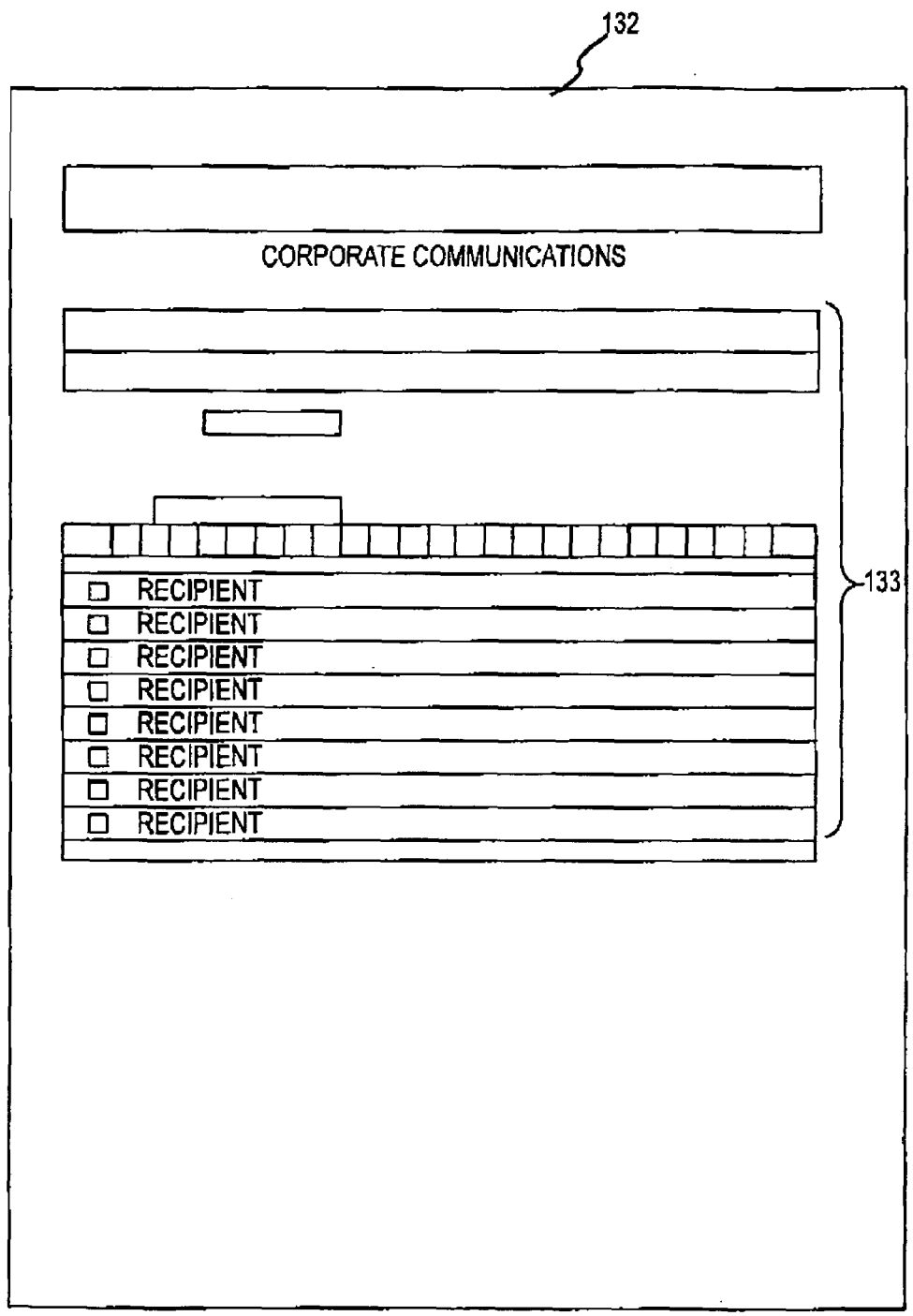
FIG. 7 is an exemplary web page for selecting recipients.
Figure 8:
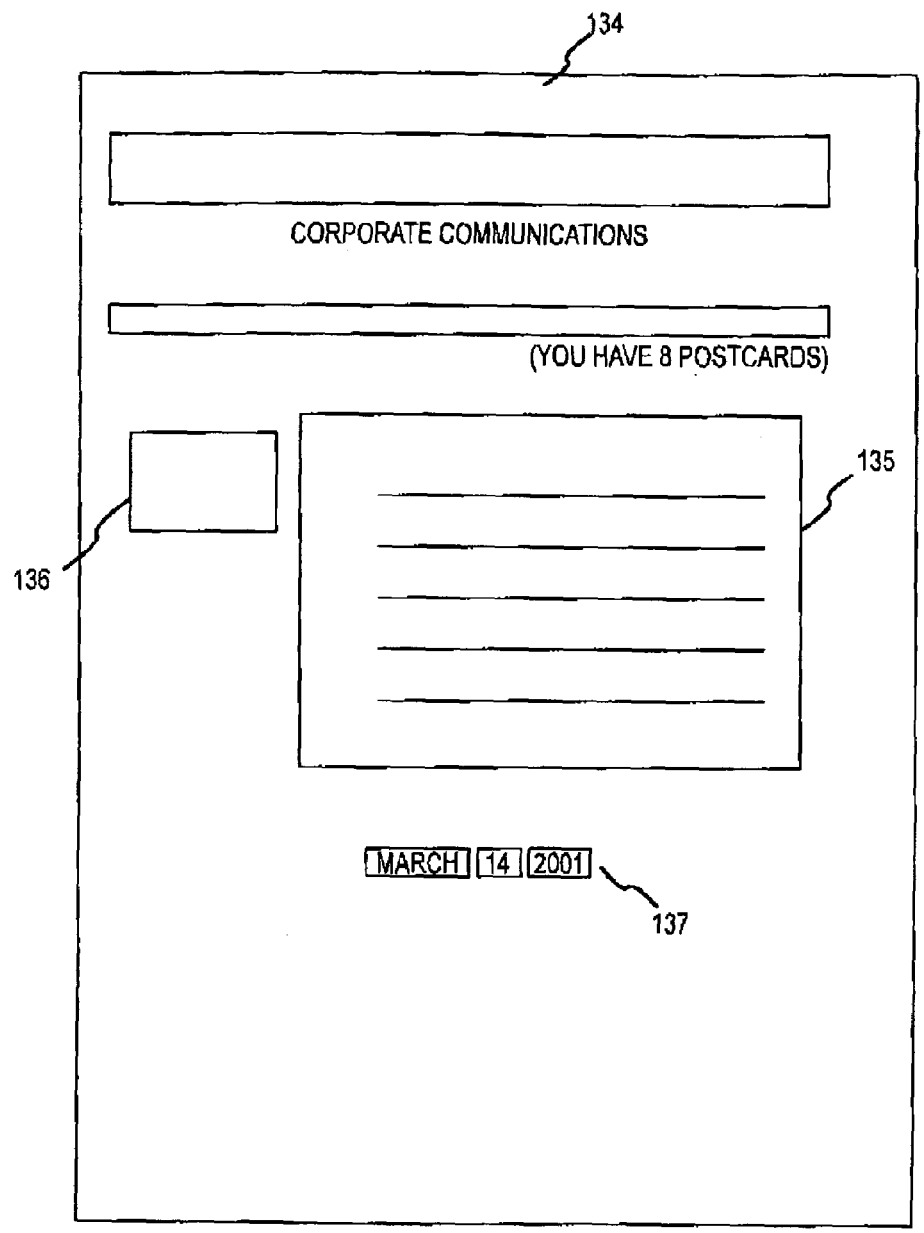
FIG. 8 is an exemplary web page for reviewing and scheduling the mail item.

The present invention generally provides a dynamic message engine configured to merge static and variable data using a variety of databases to deliver mail items to selected recipients, wherein the mail items include content which is filtered or otherwise limited by the system. In this regard, the description that follows is occasionally framed within the context of a particular application, specifically, to invitations and similar correspondence addressed to physicians regarding pharmaceutical seminars. Those skilled in the art, however, will recognize that various aspects of the present invention may be employed in any number other contexts. Similarly, while the illustrated embodiment is discussed in terms of the corporate intranets and/or the World Wide Web, the present system may be implemented using any combination of networks, including the Internet, various intranets, virtual private networks, and/or wide-area networks. Similarly, any convenient user interface and protocol may be employed.

Furthermore, it will be appreciated that the user may utilize any type of PC, workstation, PDA, or the like to interface with the web site or sites in which the various software components reside. Likewise, the various software components necessary to accomplish the objectives of the present invention may be incorporated in an external server available over the Internet, a local server (i.e., local to a particular organization) available over an internal intranet, or any combination thereof. In one embodiment, users within an organization utilize personal computers within a local intranet to access an external server and associated databases, available over the Internet, which house the various software components (e.g., HTML code, applets, servlets, and the like) necessary to allow the user to design the content and appearance of the mail items. Such fundamental client/server and Internet data communication components are known in the art, and therefore will not be described in detail below.

Referring now to the flowchart shown in FIG. 1 and the corresponding exemplary web page layouts shown in FIGS. 2-8, a process in accordance with one embodiment of the present invention will now be described. Initially, in step 10, the process is initiated (e.g., through an HTTP request) and an initial page 102 is presented to the user to confirm that the user is authorized to access the system. In the illustrated embodiment, a login name (e.g., e-mail address or the like) and an associated password are requested in a suitable form region 103. Any other convenient authentication scheme may be used.

For example, a digital certificate may be employed to authenticate the user.

After the user successfully logs-in, the user is presented with a page 104 that sets forth a menu of mail piece types (106) based on, for example, product categories and/or particular pharmaceutical products. In the illustrated embodiment, thumb-nail images are provided along with the pharmaceutical drug name, drug category, and nature of message. The nature of the message may include, for example, invitations, reminders, and thank you notes. The mail piece types may be categorized and presented in any convenient format. The user then suitably selects the desired mail piece type (step 12).

Next, a page 110 is presented to the user which sets forth a menu of talk titles 108 based on the mail piece type previously selected. The user then suitably selects the desired talk title (step 14). Talk titles may relate, for example, to advances in treatment of particular maladies and diseases.

After the talk title is selected in step 14, a page 112 is displayed to allow the user to enter event-specific information 114 (step 16). For example, in the illustrated embodiment, the event-specific information includes fields for: speaker name, credentials, location of talk, address of talk, date of talk, applicable times (e.g., for reception, dinner, etc.), RSVP phone no., and sender name. It will be appreciated that a variety of fields may be used depending upon the nature of the mail piece and context in which the mail piece is being sent. The illustrated event-specific information is not intended to be limiting.

After the information has been entered, a compiled message is produced (step 18) via a dynamic messaging engine, as described in further detail below. After an acceptable compiled message has been produced (through filtering and iterative prompting of the user as may be required) the compiled message 128 is displayed for the user in page 126.

After the user accepts the content of compiled message 128, a Web page 132 is displayed to allow the user to select recipients for the mail item (step 20). In the illustrated embodiment, a list 133 of possible recipients is presented to the user for selection through any appropriate method (e.g., a column of associated check-boxes).

Next, in web page 134, the user is prompted to review, schedule, and send the mail item to the selected recipients (step 22). More particularly, referring to FIG. 8, thumbnails of the front side (136) and back side (135) of the proposed mail item are suitably displayed for the user to review. A scheduling block 137 is also preferably provided to allow the user to specify a date on which the mail item is to be sent to the recipient or recipients specified earlier. In the illustrated embodiment, for example, a set of three drop-down menus are presented for selecting the month, day, and year for delivery. The user is preferably provided with the option to restart processing of the card in the event one or more of the components of the card are incorrect or undesirable.

Figure 9:
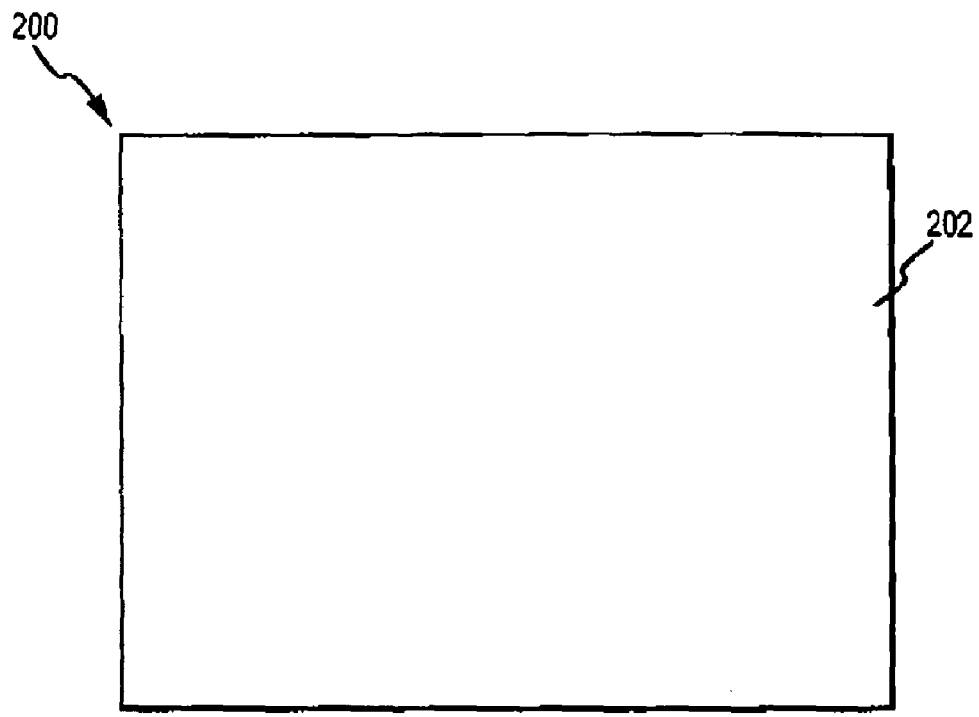
FIGS. 9 and 10 are front and back views of an example mail item layout.
Figure 10:
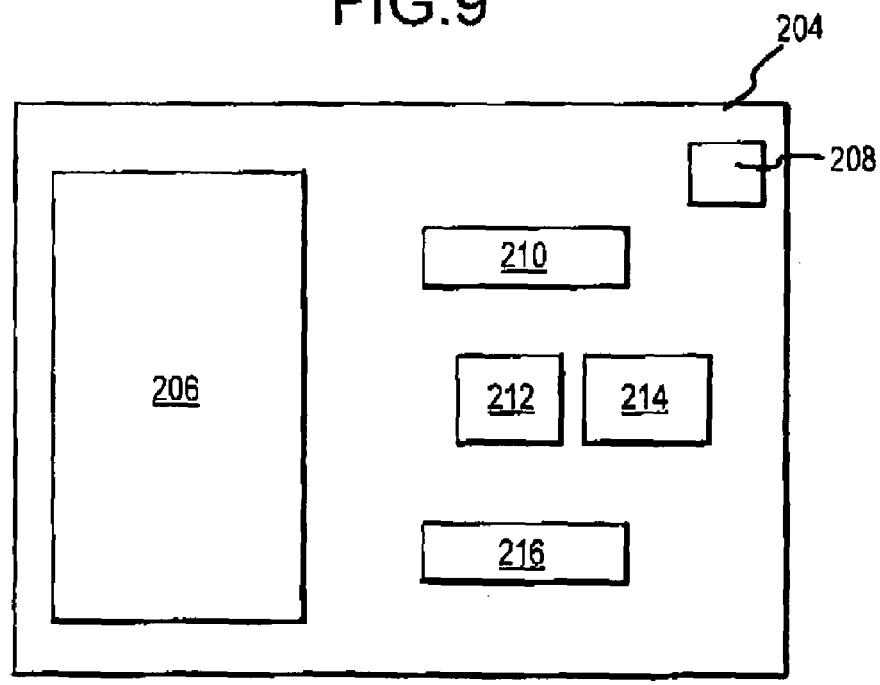

FIGS. 9 and 10 depict the front 202 and back 204 of an exemplary mail item corresponding generally to the dimensions of a traditional postcard. More particularly, front side 202 includes any suitable graphic, photo, text, or the like as may be required depending upon the context of the communication. Back side 204 generally includes a text region 206 (e.g., for displaying the compiled message), an address block 210 (e.g., for the sender), a second address block 216 (e.g., for the recipient), and one or more added regions 212 and 214 for displaying, for example, a map of the sender's location, a photo of the sender, a trademark graphic, or any other such image. It will be appreciated that the exemplary mail item design shown in FIGS. 9 and 10 is non-limiting, and that the methods provided by the present invention may be used in connection with any desired mail item geometry and layout.

Figure 11:
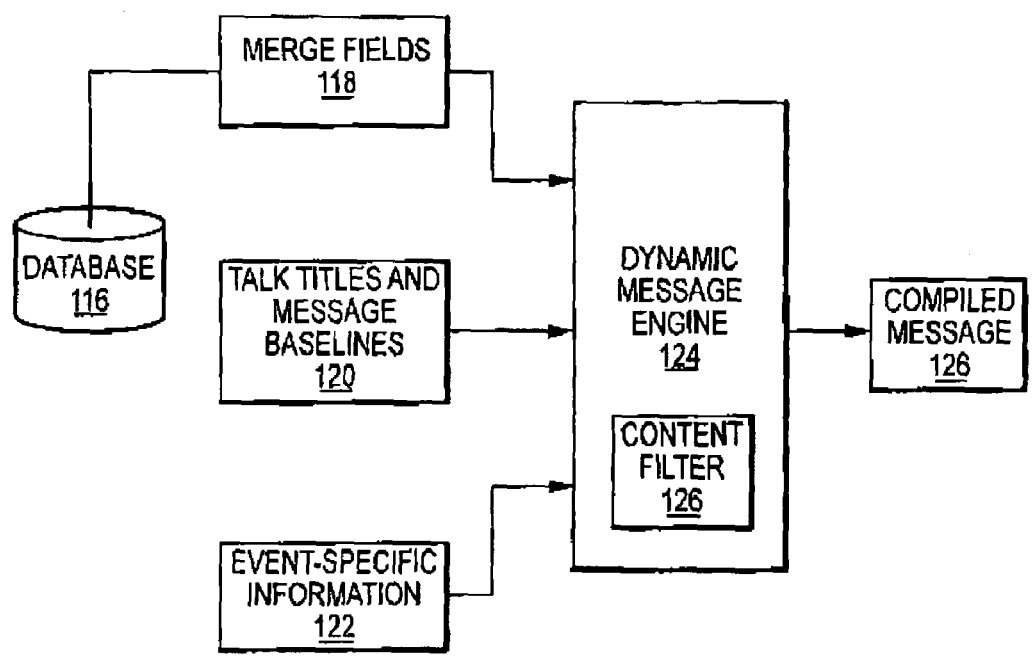
FIG. 11 is a conceptual block diagram of a process and system in accordance with the present invention.

FIG. 11 shows a process-flow in accordance with another aspect of the present invention. As described above, the compiled message is produced in step 18 and displayed for review by the user (e.g., web page 126 in FIG. 6). As shown in FIG. 11, compiled message 126 is generally produced by dynamic message engine (DME 124) 124 using event-specific information 122, talk titles and message baselines 120, and merge fields 118 populated from a database (or databases) 116. A content filter 126 may also be employed in connection with DME 124 to ensure that the content of compiled message 126 fits within predetermined guidelines, described in further detail below.

Talk titles, message baselines, and event-specific information are preferably selected by the user in previous steps (e.g., steps 14 and 16 in FIG. 1). Merge fields 118 are populated by names, addresses, and other such information associated with the particular recipients selected in step 20 and previously stored in database 116. Database 116 might include, for example, a physician database that includes contact information and specialty information for particular physicians likely to desire information regarding pharmaceutical products.

DME 124 then combines the merge field information 118, talk title information 120, and event-specific information 122 into a compiled message 126. In a preferred embodiment, the content of the candidate compiled message is processed by content filter 126, which functions to limit the universe of acceptable words, phrases, and other content ultimately displayed for the user in step 18.

Figure 13:
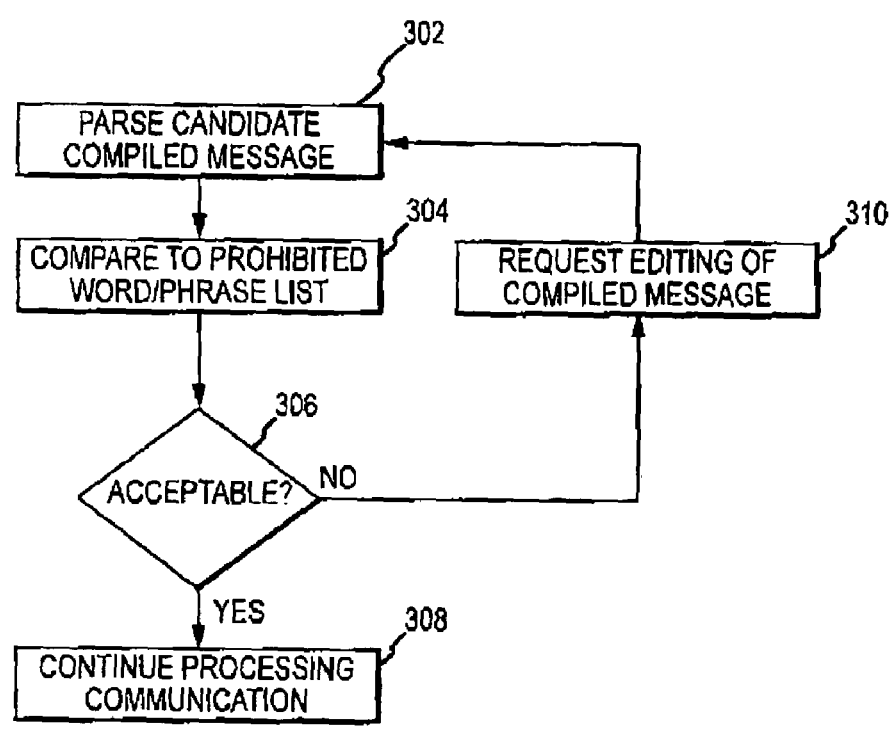
FIG. 13 is a flowchart depicting a content filtering process in accordance with one embodiment of the present invention.

Referring to FIGS. 11 and 13, content filter 126 may be configured to filter the content according to any convenient criteria. For example, the content filter may parse the candidate compiled message into individual words and phrases (step 302), then compare the parsed information with a database of prohibited words and/or phrases (step 304). In the event that the candidate compiled message includes prohibited words or phrases, a suitable error message may be displayed to the user and the system returns to a previous step to allow the user to modify the text accordingly (step 310). The user may also be presented with a list of acceptable alternatives to the prohibited content (e.g., synonyms for a prohibited word).

The list of prohibited words and phrases might include, for example, words which have legal significance ("malpractice", "guarantee", "warrant", "indemnify", and the like), words which tend to be used as superlatives ("best", "total", "all", and the like), and any other category of words that might be appropriate given the context of the communication. In addition, the message text might be subjected to conventional grammar and spell-checking.

Once an acceptable candidate compiled message is produced, processing can continue (step 308). In the illustrated embodiment, for example, processing continues with selection of the recipients (step 20 in FIG. 1). Although content filter 126 has been described as parsing and comparing the candidate text to a database of prohibited words, other filtering schemes may be used, e.g., systems based on artificial intelligence, natural language processing, neural network training of text parsers, or the like.

In another embodiment of the present invention the user is allowed to select words, terms, and phrases from a predetermined set of acceptable contents. In this way, an iterative filtering step may not be required. In yet another embodiment, the filtering step includes both allowing the user to select from a predetermined set of acceptable terms as well as allowing the user to enter arbitrary (pre-filter) text into one or more fields.

Figure 12:
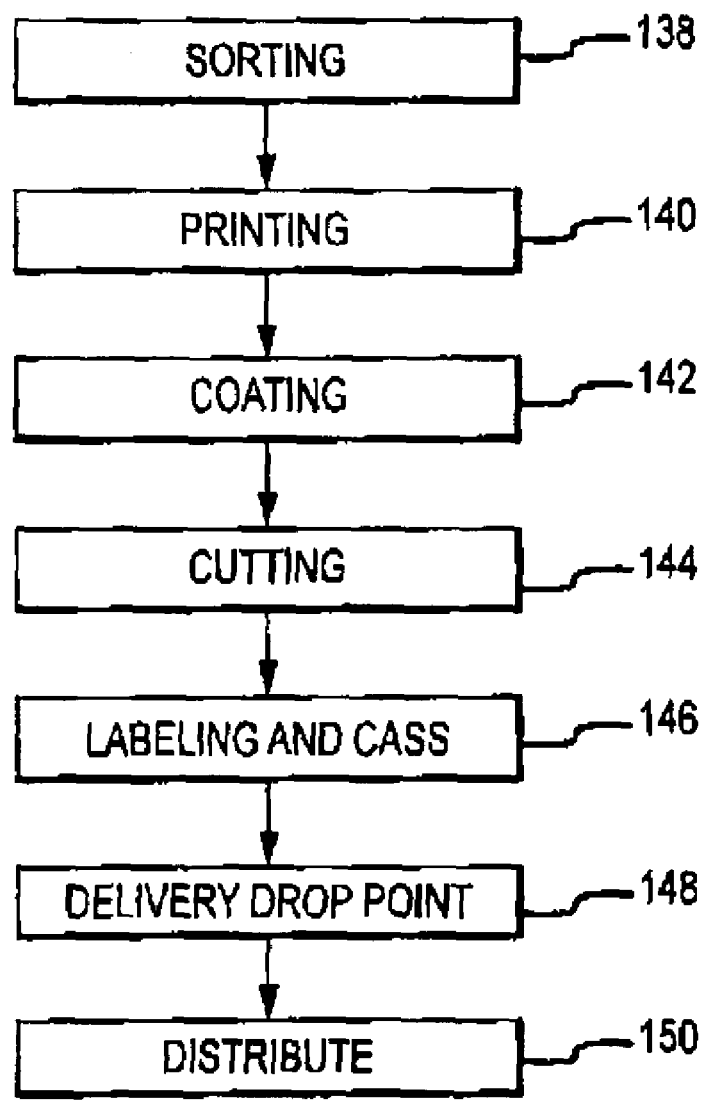
FIG. 12 is a flowchart depicting a mail-item creation process in accordance with the present invention.

Referring now to FIG. 12, the information acquired from previous steps is then converted into a mail item for delivery to the desired recipients. More particularly, after suitable mail files are created, the files are suitably transmitted to a sorter (step 138), printed via one or more printers (step 140), processed by a coating machine if appropriate (step 142), singulated by a cutting apparatus (step 144), labeled and subjected to a CASS system (step 146), then delivered to a suitable drop point (step 148), e.g., U.S. mail. The mail item is then distributed and delivered by the appropriate postal route to the desired recipients (step 150). In this regard, a suitable printing and delivery system is disclosed in application Ser. No. 09/544,005, entitled METHODS AND APPARATUS FOR GENERATION AND DISTRIBUTION OF SURFACE MAIL OBJECTS, filed Apr. 6, 2000, and assigned to AmazingMail.Com. The entire contents of this document are hereby incorporated by reference.

The present invention may also be implemented to produce e-mails rather than hardcopy postcards and the like. That is, it is possible to use the dynamic messaging engine, merge fields, event-specific information, etc., to produce e-mails which are sent to selected individuals. In addition, it is possible to attach various media files (e.g., mpegs, jpegs, etc.) to the e-mail. For example, it might be advantageous to attach a movie file which shows a video clip of the presenter discussing the topic of interest or requesting the recipient's attendance. In addition, a map of the location may be included on the hard-copy or e-mail transmission. This map may be pre-generated or generated on the fly using a WWW-based map generator.

Although the invention has been described herein in conjunction with the appended drawings, those skilled in the art will appreciate that the scope of the invention is not so limited. Modifications in the selection, design and arrangement of the various components and steps discussed herein may be made without departing from the scope of the appended claims.

The invention claimed is:

1. A computer implemented method of producing a mail item, said method comprising the steps of:
   a dynamic messaging engine receiving electronic event-specific information, merge field information, and talk title information from a user;
   said dynamic messaging engine compiling said event-specific information, merge field information, and talk title information to produce a compiled message, and thereafter content-filtering said complied message to produce a content-filtered compiled message;
   said dynamic messaging engine providing said content-filtered compiled message to said user for content review;
   said user determining whether to modify the content of said content-filtered compiled complied message to produce a modified content-filtered compiled message;
   said user accepting either of said content-filtered compiled message or said modified content-filter compiled message to produce an accepted content-filtered compiled message;
   said user selecting a recipient for said accepted content-filtered compiled message after said step of producing said accepted content-filtered compiled message and providing said accepted content-filtered compiled message to said dynamic messaging engine; and
   said dynamic messaging engine receiving said accepted content-filtered compiled message and producing said mail item for delivery to said selected recipient, said mail item comprising said accepted content-filtered compiled message.

2. The method of claim 1, wherein said content-filtering step includes the step of presenting a predefined set of acceptable input for said event-specific information.

3. The method of claim 1, wherein said content-filtering step includes the steps of parsing the event-specific information and producing an error message if said parsing step identifies unacceptable content.

4. The method of claim 3, wherein said unacceptable content includes a list of prohibited words.

5. The method of claim 3, wherein said unacceptable content includes a list of prohibited phrases.

6. The method of claim 1, wherein said merge field information is populated from a database.

7. The method of claim 1, wherein said mail item comprises a post-card.

8. The method of claim 1, wherein said mail item comprises an e-mail message.

9. The method of claim 8, wherein said mail item further includes one or more attached media files.

10. The method of claim 1, wherein said mail item includes a photograph associated with the sender of said mail item.

11. The method of claim 1, wherein said mail item includes a map indicating a geographical location associated with said event-specific information.

* * * * *